(12) United States Patent  (10) Patent No.: US 6,750,953 B1
Douglas                    (45) Date of Patent:      Jun. 15, 2004

(54) POSITION DETECTING LASER RECEIVER

(75) Inventor: Frank B. Douglas, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/426,770

(22) Filed: Apr. 30, 2003

(51) Int. Cl.[7] .............................. G01C 3/08; G01J 1/42
(52) U.S. Cl. .................................... 356/4.08; 250/208.5
(58) Field of Search ....................... 250/208.5; 356/4.08, 356/3.08

(56) References Cited

U.S. PATENT DOCUMENTS

| 4,023,908 | A | * | 5/1977 | Johnson et al. |
| 4,693,598 | A | | 9/1987 | Sehr |
| 5,189,484 | A | | 2/1993 | Koschmann et al. |
| 5,880,461 | A | | 3/1999 | Spear |
| 5,886,776 | A | | 3/1999 | Yost et al. |
| 6,263,595 | B1 | | 7/2001 | Ake |
| 6,292,258 | B1 | | 9/2001 | D'Alessandro et al. |
| 6,297,488 | B1 | | 10/2001 | Beraldin et al. |
| 6,308,428 | B1 | | 10/2001 | Creighton, III |
| 6,317,200 | B1 | | 11/2001 | Wang et al. |
| 6,337,473 | B2 | | 1/2002 | Yamazaki et al. |

* cited by examiner

Primary Examiner—Stephen C. Buczinski
(74) Attorney, Agent, or Firm—Dinsmore & Shohl, LLP

(57) ABSTRACT

Receiver circuits are provided for detecting a target light source such as a swept laser beam. The circuits include a photodetector adapted to produce a first detector output signal and a second detector output signal where the relative amplitudes of the first and second detector output signals are related to the position of a swept laser beam impinging thereon. A first log signal is determined, which is based upon a logarithmic and optionally scaled calculation utilizing the first detector output signal. Correspondingly, a second log signal is determined, which is based upon a logarithmic and optionally scaled calculation utilizing the second detector output signal. The position of the beam is then computed based upon a subtraction of the second log output signal from the first log output signal.

32 Claims, 8 Drawing Sheets

POSITION DETECTING LASER RECEIVER

BACKGROUND OF THE INVENTION

The present invention relates in general to light beam detecting and amplifying circuits and in particular to laser receiver circuits for locating the position of a rotating or scanning laser beam.

Rotating or scanning laser beam transmitters are commonly used in the fields of civil engineering, construction, agriculture, and surveying to establish a reference plane of light useful for taking measurements within a work area. In order to detect the beam, a laser receiver is positioned within the operating range of the laser transmitter and a photosensitive detecting circuit within the receiver is used to monitor the position of the reference plane of light relative to the receiver. Basically, the receiver includes two or more photosensitive detectors that generate photocurrents in response to sensing a strike by the reference plane of light. By measuring the intensity of the beam strike upon each detector, the position of the receiver relative to the reference plane may be determined.

A typical detecting circuit 10 for a laser receiver is illustrated in FIG. 1. A photodetector 12 includes a first detector 14 and a second detector 16. As a laser beam 18 is swept across the photodetector 12, a first detector output current $I_{(A)}$ is generated that is generally proportional to the intensity of the laser beam 18 impinging on the first detector 14. Similarly, a second detector output current $I_{(B)}$ is generated that is generally proportional to the intensity of the laser beam 18 impinging on the second detector 16. The first and second detector output currents $I_{(A)}$ and $I_{(B)}$ generated by the photodetector 12 are typically weak, thus some sort of amplification and/or signal conditioning is required before the signals are useful for determining beam position. Accordingly, a first linear transimpedance amplifier 20 is connected to the first detector 14 to convert the first detector output current $I_{(A)}$ to a first amplifier output voltage A. Similarly, a second linear transimpedance amplifier 22 is connected to the second detector 16 to convert the second detector output current $I_{(B)}$ to a second amplifier output voltage B.

The laser receiver 10 must be able to detect the laser beam 18 over a wide dynamic range of incident beam power to provide a suitable range of operation for practical applications. As a result, the manner in which the receiver 10 determines the beam position must be relatively independent of incident beam power, and thus correspondingly independent of the first and second detector output currents $I_{(A)}$, $I_{(B)}$. Typically, to determine beam position independent of incident beam power, the difference of the first and second amplifier output voltages A, B is computed at the first summer or processing circuit 24. The sum of the first and second amplifier output voltages A, B is computed at the second summer or processing circuit 26, and a processing circuit 28 is provided to compute the beam position by dividing the results of the first summer 24 by the results of the second summer 26. The function of the of processor 28 can be expressed as:

$$k_1 \frac{A-B}{A+B},$$

where $k_1$ is a constant that reflects an optional gain provided to scale the resulting beam position computation, A is the output voltage of the first linear transimpedance amplifier 20, and B is the output voltage of the second linear transimpedance amplifier.

While the above described technique for determining beam position can provide satisfactory results for determining beam position, there are some practical limitations to the circuit. Because of the necessary wide dynamic range required of the laser receiver 10, the transimpedance amplifiers 20, 22, and the signal detection and processing circuits 24, 26, 28 must be capable of high gain processing, which affects complexity, size, and power consumption of the receiver circuit. Laser receivers are typically batter powered, particularly when employed in applications where conventional electric power lines are not readily available. Thus, battery life is an important factor affecting the utility of the device and the efficiency of those utilizing the device. In view of the above, laser receivers are relatively large in size, contain relatively complex circuitry, and require power in a manner that does not maximize the usefulness of batteries.

SUMMARY OF THE INVENTION

The present invention overcomes the disadvantages of previously known receivers by providing circuits that respond logarithmically to a detected light source. The logarithmic responses are processed for locating the position of a target light source such as a rotating or scanning laser beam.

Briefly, a laser receiver circuit includes a photodetector comprising at least one photosensitive device. The photodetector is adapted to produce a first detector output signal and a second detector output signal where the relative amplitudes of the first and second detector output signals are related to the position of a laser beam impinging thereon. A first log signal is determined, which is based upon a logarithmic and optionally scaled calculation utilizing the first detector output signal. Correspondingly, a second log signal is determined, which is based upon a logarithmic and optionally scaled calculation utilizing the second detector output signal. The position of the beam is then computed based upon a subtraction of the second log output signal from the first log output signal.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE PREFERRED EMBODIMENTS

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that logical, mechanical and electrical changes may be made without departing from the spirit and scope of the present invention.

Figure 1:
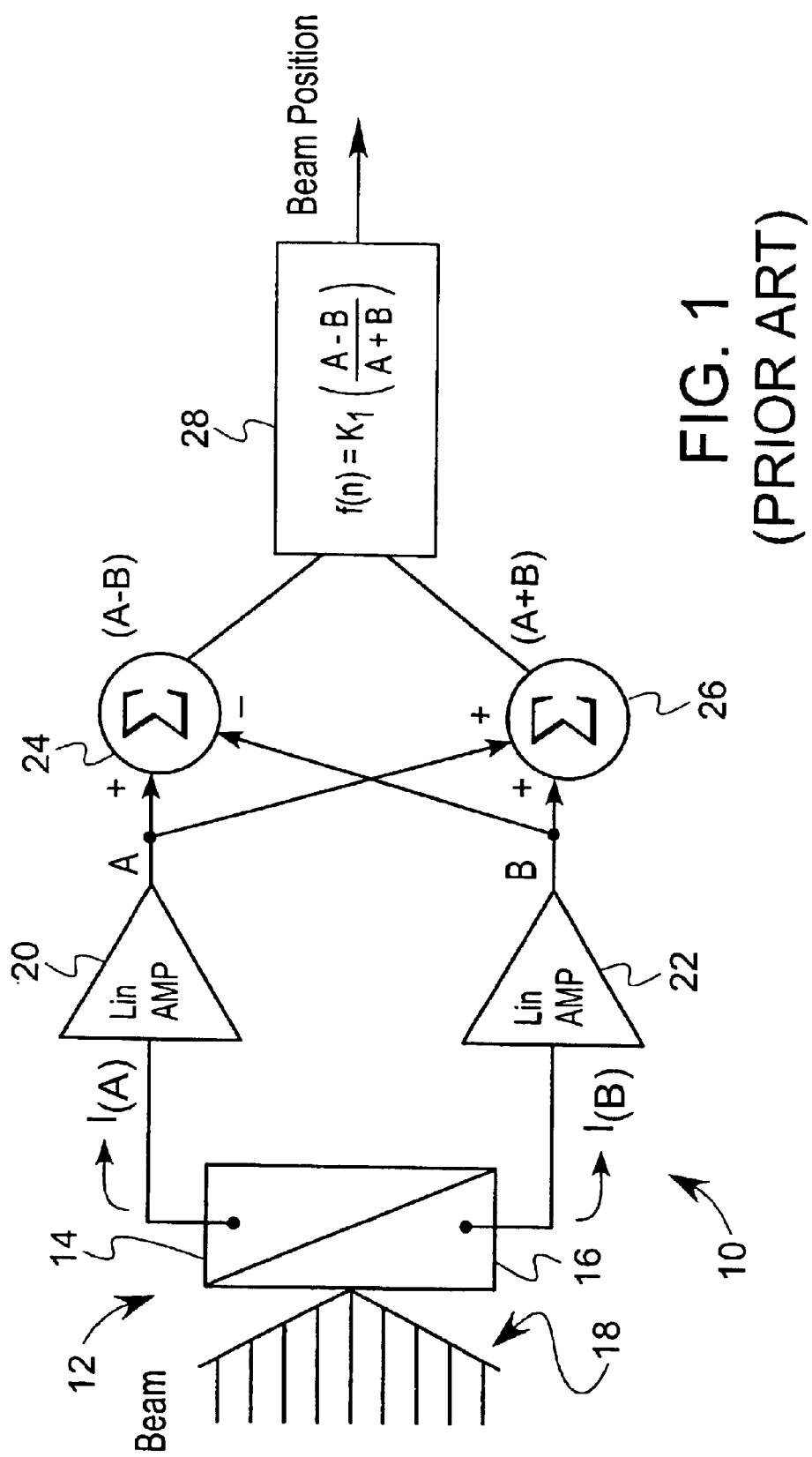
FIG. 1 is a block diagram of a circuit for detecting the position of a beam of light according to the prior art.
Figure 2:
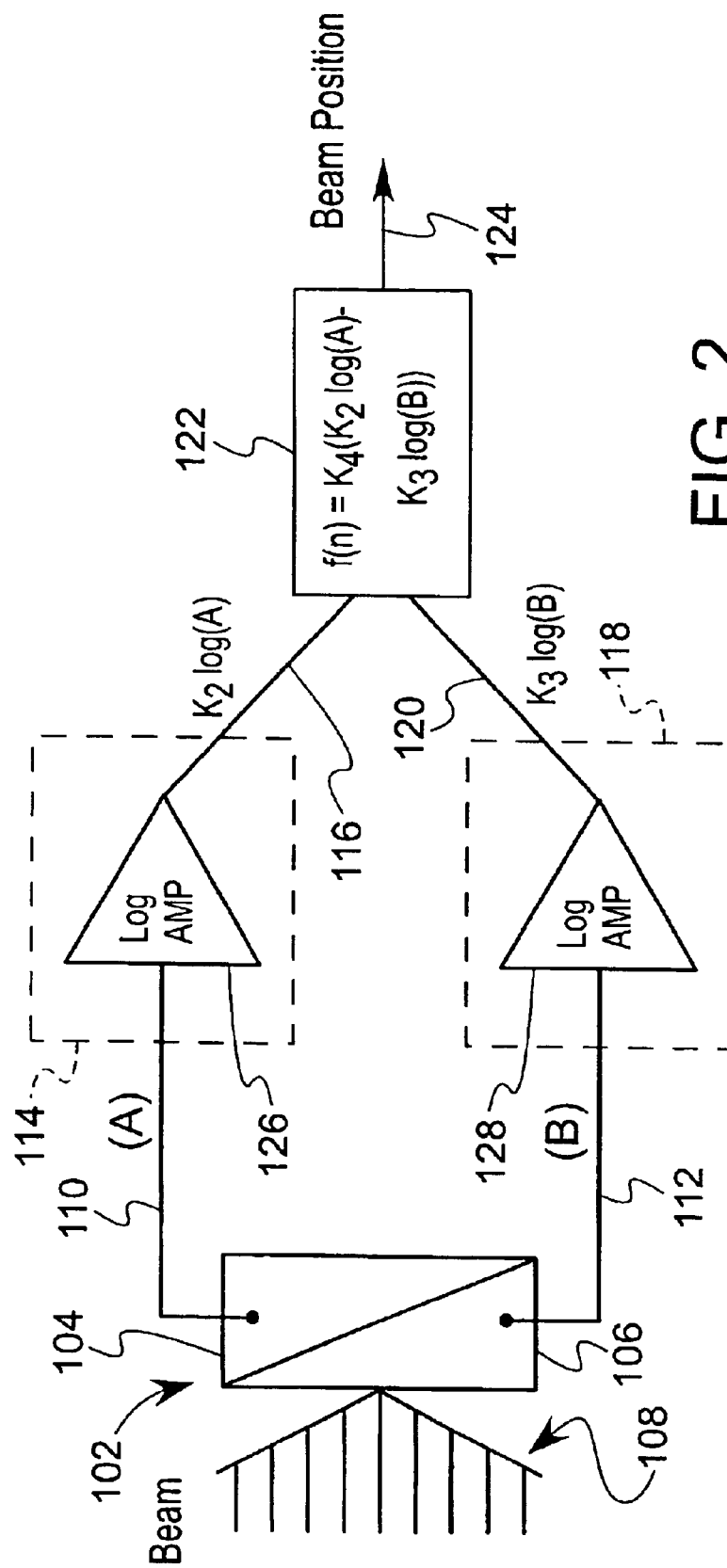
FIG. 2 is a block diagram of a circuit for detecting the position of a beam of light according to an embodiment of the present invention.

Referring to FIG. 2, a system 100 for detecting the position of a laser beam according to an embodiment of the present invention is illustrated. The system 100 includes a photodetector 102 that comprises at least one photosensitive device. The photodetector 102 is illustrated as having a first detector section 104 and second detector section 106 positioned as adjacent and inverted right triangles for conceptual purposes. In practice, any suitable geometries, patterns and/or quantities of photosensitive devices may be used. For example, the photodetector 102 can be discrete devices such as PIN diodes or silicon photodiodes. Alternatively, the photodetector 102 may comprise or one or more monolithic devices. Monolithic devices typically have multiple outputs from separate active areas on a common substrate, examples of which include bi-cells, split cells and position detector cell. Also, the photodetctor 102 may be arranged in any practical manner. For example, where the photodetector 102 comprises a plurality of PIN diodes, such PIN diodes may be arranged in a single column. The devices may also optionally connect to an electrical weighting network.

As a laser beam 108 is swept across the photodetector 102, a first detector output signal 110 (signal A), and a second detector output signal 112 (signal B) are generated where the relative amplitudes of the first and second detector output signals 110, 112 are related to the position of a beam impinging thereon. A first processor 114 processes the first detector output signal 10 to produce a first processor output 116 that is a logarithmic function of the first detector output signal 110. The first processor output 116 may also optionally provide some gain to its output denoted by $k_2$. If the first detector output signal 110 is denoted as A, then the first processor output 116 may be expressed as $k_2 \log(A)$. Similarly, a second processor 118 processes the second detector output signal 112 to produce a second processor output 120 that is a logarithmic function of the second output signal 112. The second processor output 120 may optionally provide some gain to its output denoted by $k_3$. If the second detector output signal 112 is denoted as B, then the second processor output 120 may be expressed as $k_3 \log(B)$. The logarithmic functions implemented by the first and second processors 114, 118 allows the receiver circuit 100 to accommodate large variations in incident beam power by compressing the intensity of the beam 108 detected by the photocurrent sensor 102.

As used throughout this specification, the terms "logarithm" and "log" shall be defined expansively to include any form of the logarithmic expression $\log_b(x)$. For example, a log, as used herein, may have any base (b) including the transcendental number $e \approx 2.7182818$. Therefore, the terms "logarithm and "log" shall include the natural log, commonly denoted $\ln(x)$.

A third processor 122 receives as input, the first and second processor outputs 116, 120 and produces a third processor output 124 that represents the position of the laser beam 108. The third processor 122 determines the position of the laser beam 108 by implementing a function that computes the difference of the first and second processor outputs 116, 120. The third processor 122 may also optionally provide a gain constant, for example, to scale the resulting computation. The third processor may thus implement the function:

$$f(n) = k_4(k_2 \log(A) - k_3 \log(B)).$$

Typically, the gain constants $k_2$ and $k_3$ are tuned substantially to the same value. Moreover, where the first and second processors 114, 118 provide unity gain, the function computed by the third processor 122 simplifies to:

$$f(n) = k_4 (\log(A) - \log(B)).$$

The first processor 114 can be implemented in hardware, such as by a using log converter 126 operatively configured to output a signal that represents the log of the first detector output signal 110. Similarly, the second processor 118 can be implemented using a log converter 128 operatively configured to output a signal that represents the log of the second detector output signal 112. The first and second processors 114, 118 can also be implemented in software by computing the log of a digital representation of the respective first and second detector output signals 110, 112. Likewise, the third processor 122 can be implemented in hardware or in software.

Figure 3:
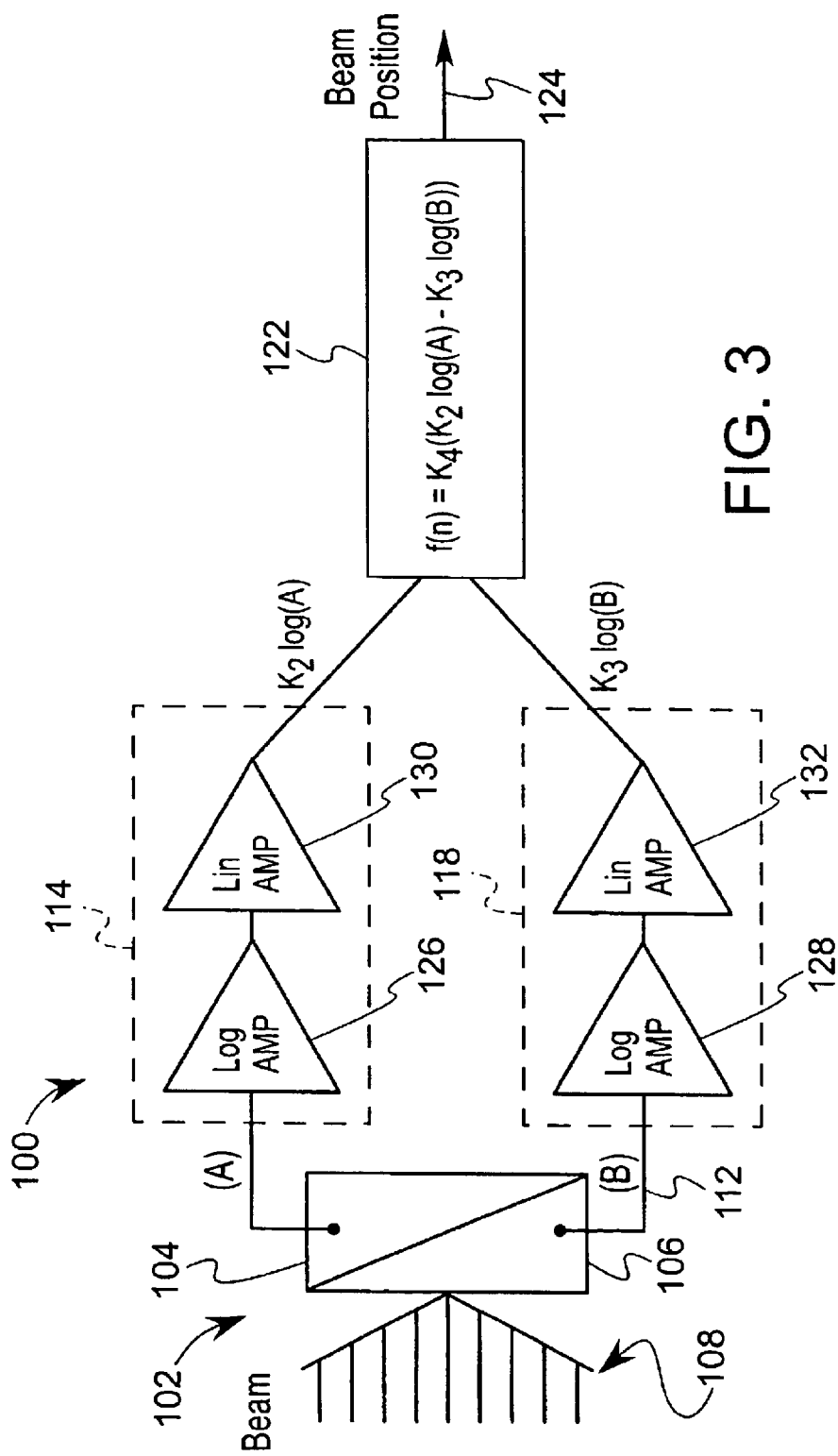
FIG. 3 is a block diagram of a circuit for detecting the position of a beam of light according to another embodiment of the present invention.

Referring to FIG. 3, where the first and second processors 114, 118 are implemented in hardware as log converters 126, 128, gain may also be provided via a separate linear amplifier in series with the respective logarithmic converter 126, 128. As shown, the first processor 114 includes the series combination of a log converter 126 and a linear amplifier 130. Similarly, the second processor 118 includes the series combination of a log converter 128 and a linear amplifier 132. The gain $k_2$ applied to the log of the first detector output signal 110 (signal A) includes the gain introduced by both the log converter 126 and the linear amplifier 130. Likewise, the gain $k_3$ applied to the log of the second detector output signal 112 (signal B) includes the gain introduced by both the log converter 128 and the linear amplifier 132.

Figure 4:
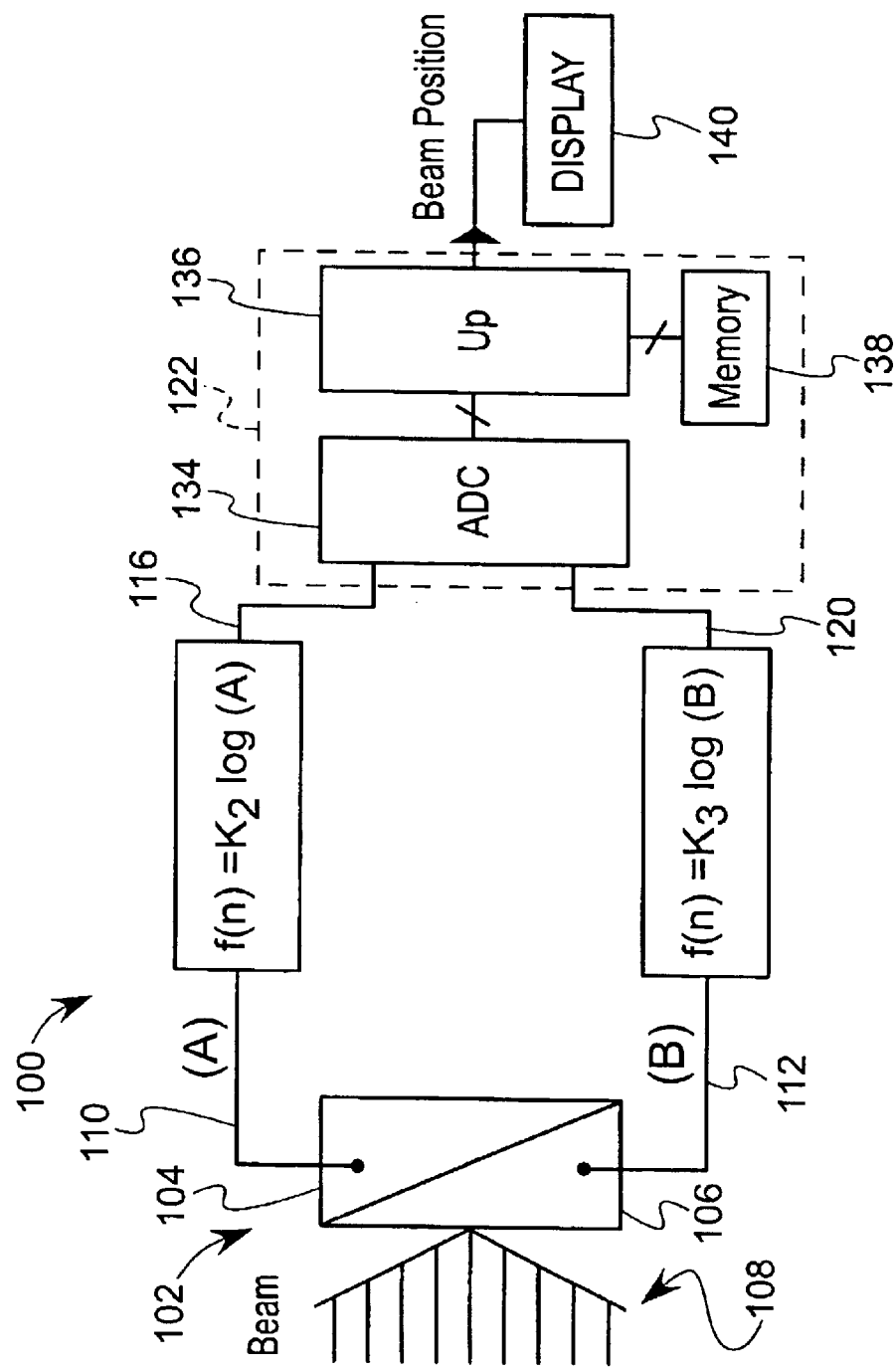
FIG. 4 is a block diagram of a circuit for detecting the position of a beam of light according to another embodiment of the present invention.

As pointed out above, any of the first, second and third processors 114, 118, 122 can be implemented in software. FIG. 4 schematically illustrates one exemplary approach whereby the third processor 122 is implemented in software. The third processor 122 comprises an analog to digital converter 134 to transform the first and second processor outputs 116, 120 into digital representations. The output of the analog to digital converter 134 is communicably coupled to a processor 136 that is programmed to compute beam position by subtracting the digital representation of the first processor output by the digital representation of the second processor output.

The processor 136 is also communicably coupled to a memory device 138, which provides operating instructions and/or memory locations for completing the necessary computations to determine beam position. The software operating on the processor 136 may also be used to optionally scale the beam position calculation, and provide other operations relative to determining beam position. For example, the processor 136 may compensate for any non-ideal behavior of the logarithmic responding circuits in the first and second processors 114, 118, such as when the signal is weak. The compensation may be useful for example, to extend the operational range of the circuit. Additionally, the processor may be used to drive any number of output devices such a display 140, which provides a visual indication of beam position determined by the processor 136.

Figure 5:
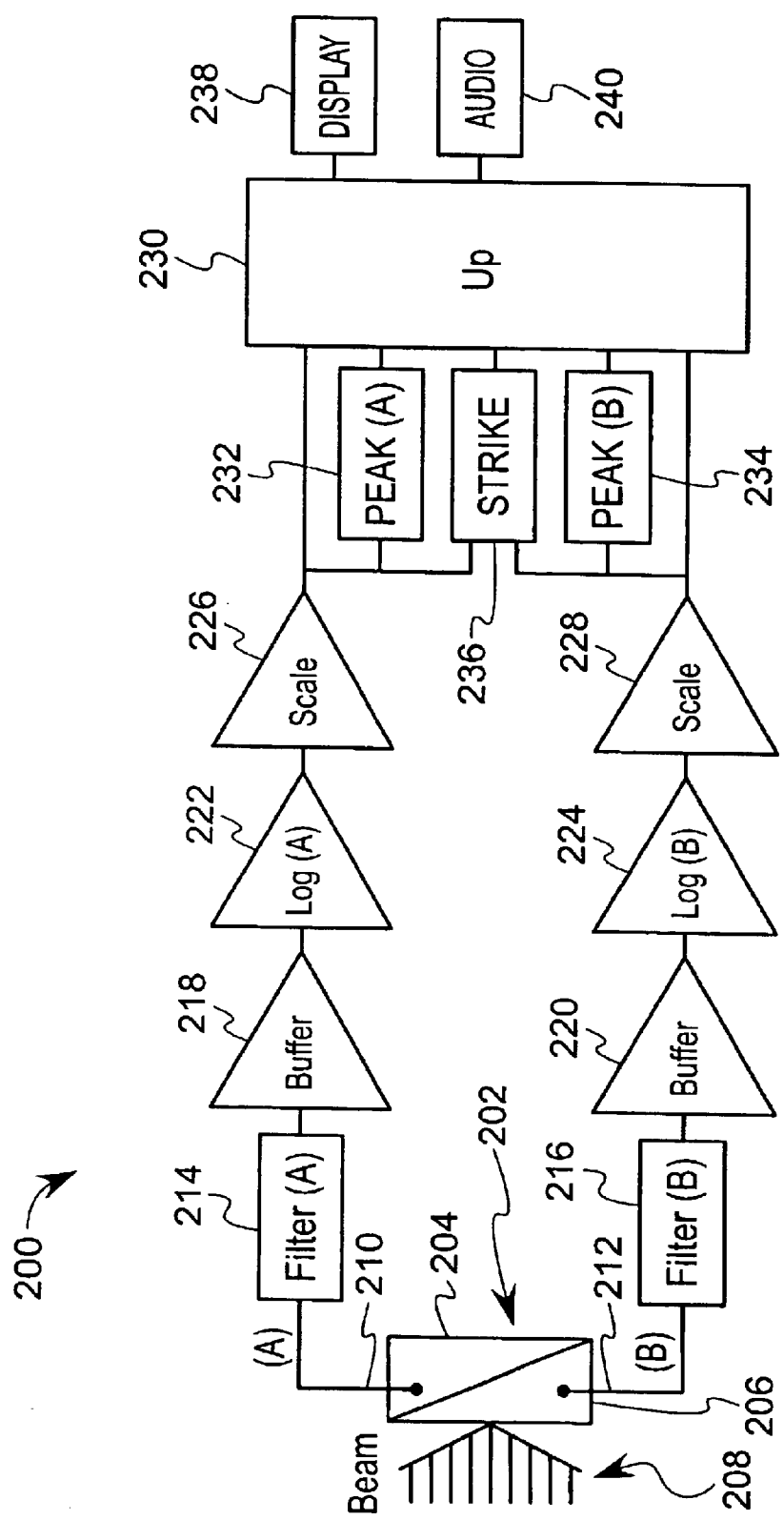
FIG. 5 is a block diagram of a receiver circuit according to yet another embodiment of the present invention.

Referring to FIG. 5, a receiver circuit 200 for detecting the position of a laser beam according to an embodiment of the present invention is illustrated. The receiver circuit 200 includes a photodetector 202 that comprises at least one photosensitive device. The photodetector 202 is illustrated as having a first detector section 204 and second detector section 206 positioned as adjacent and inverted right triangles for conceptual purposes. As a laser beam 208 is swept across the photodetector 202, a first detector output signal 210 (signal A) and a second detector output signal 212 (signal B) are generated where the relative amplitudes of the first and second detector output signals 210, 212 are related to the position of the beam impinging on the photodetector 202.

The first and second detector outputs 210, 212 each optionally pass through an associated filter 214, 216. The filters 214, 216 may be used for example, to remove ambient effects such as the effect of daylight, provide electromagnetic interference filtering, or to provide high frequency anti-aliasing filtering.

The first and second detector outputs 210, 212 (or outputs of the optional filters 214, 216) may comprise weak signals. As such, optional buffers 218, 220 may be provided to increase the strength of, or to otherwise buffer the associated signals. The output of the buffers 218, 220 are communicably coupled to respective log amplifiers 222, 224 and optional scaling amplifiers 226, 228. The first log amplifier 222 is operatively configured to compute a first log signal based upon the first detector output signal 210. Similarly, the second log amplifier 224 is operatively configured to compute a second log signal based upon the second detector output signal 212. The output of the scaling amplifier 226 is the log of the first detector output signal 210 (signal A) that has been optionally filtered and scaled, and will be denoted as $k_2 \log(A)$. Likewise, the output of the scaling amplifier 228 is the log of the second detector output signal 212 (signal B) that has been optionally filtered and scaled, and will be denoted as $k_3 \log(B)$.

The respective first and second amplifier output signals of the scaling amplifiers 226, 228 are communicably coupled to a third processor such as microprocessor 230, which implements a difference circuit adapted to compute beam position based upon the subtraction of the second log signal from the first log signal. It should be observed that where the microprocessor does not have a built in analog to digital converter, additional circuitry (not shown) such as filters and separate analog to digital filters might be required. Also, the third processor may optionally be constructed using hardware components.

The output of the scaling amplifier 226 is further communicably coupled to a peak detector 232 to determine the maximum output of the scaling amplifier 226 as the laser beam 208 is swept across the photodetector 202. Similarly, the output of the scaling amplifier 228 is further communicably coupled to a peak detector 234 to determine the maximum output of the scaling amplifier 228 as the laser beam 208 is swept across the photodetector 202. The outputs of the scaling amplifiers 226, 228 are each further coupled to a strike detector 236. The strike detector 236 detects when a laser beam 208 strikes the photodetector 202. The outputs of the peak detectors 232, 234 and the strike detector 236 are also coupled to the microprocessor 230. Depending upon the speed of the microprocessor 230 and the corresponding analog to digital converters, the peak detectors 232, 234 may be unnecessary as their function can be implemented within the microprocessor 230.

When a laser pulse strikes the photodetector 202, the beam position is determined. For example, the strike detector 236 may initiate the determination of the beam position by sending a signal to the microprocessor 230 indicating the detection of a laser pulse. The microprocessor 230 then obtains readings either directly from the output of the scaling amplifiers 226, 228, or optionally from the peak detectors 232, 234. After obtaining the appropriate readings, the microprocessor 230 implements the function:

$$f(n)=k_4(k_2 \log(A)-k_3 \log(B))$$

by subtracting and optionally scaling and applying correction to the values read either from the scaling amplifiers 226, 228 or the peak detectors 232, 234. The computed beam position is then conveyed to a user, such as by directing the results of the beam location determination to a display 238 and/or audible device 240.

Laser Receiver Schematic

Figure 6A:
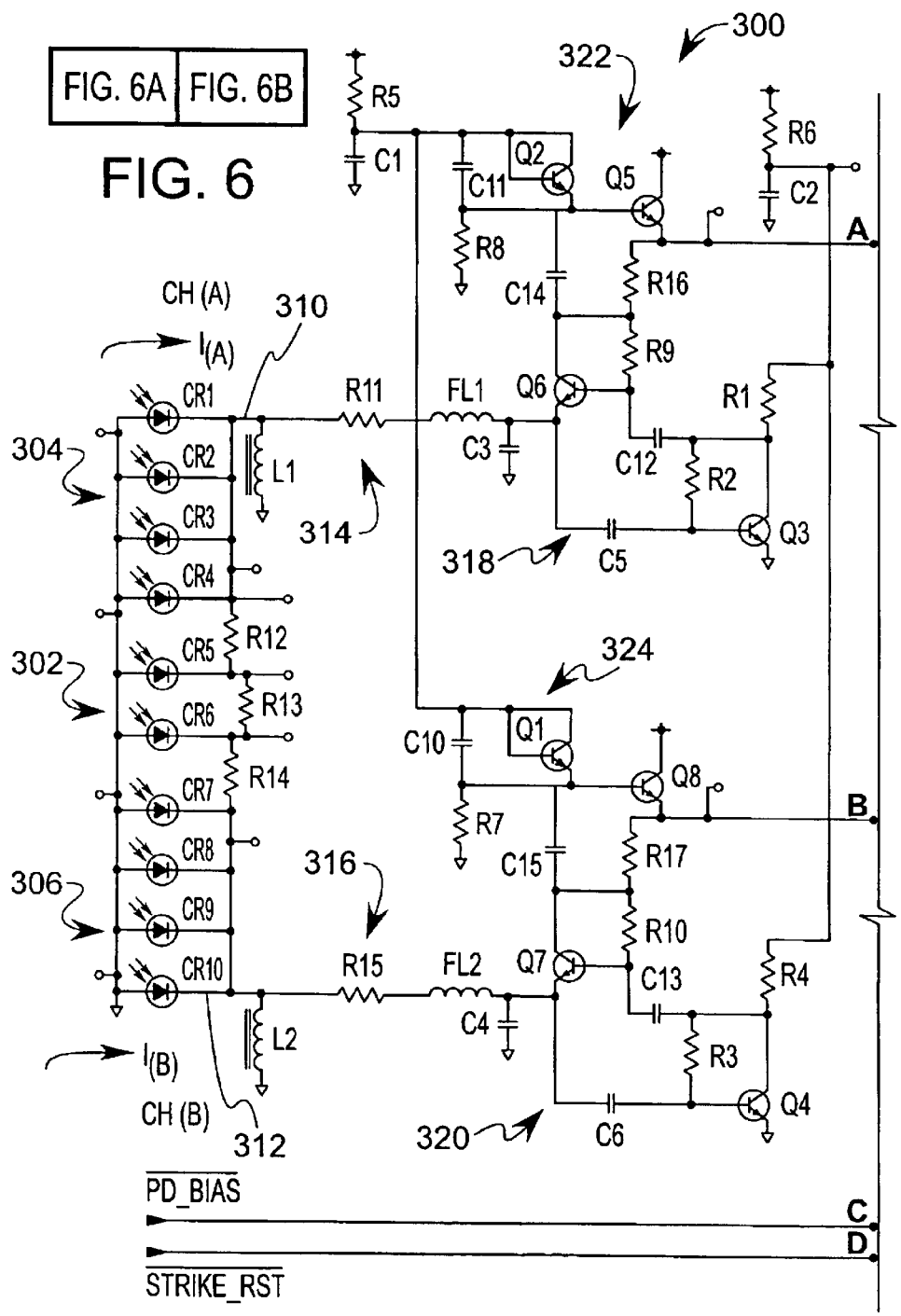
FIGS. 6A–6B are a schematic illustration of an exemplary circuit implementing the block diagram of FIG. 5.
Figure 6B:
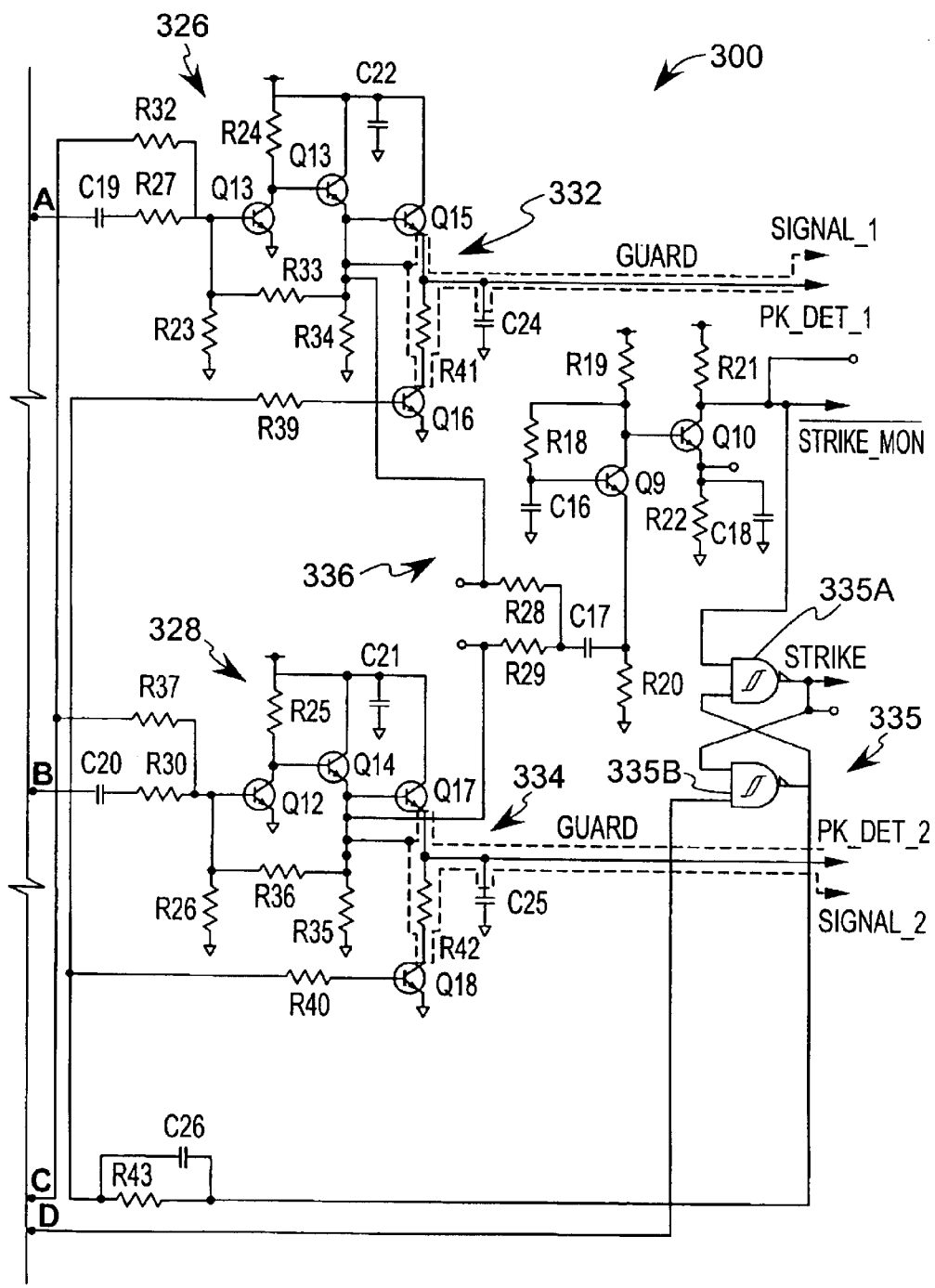
Figure 7:
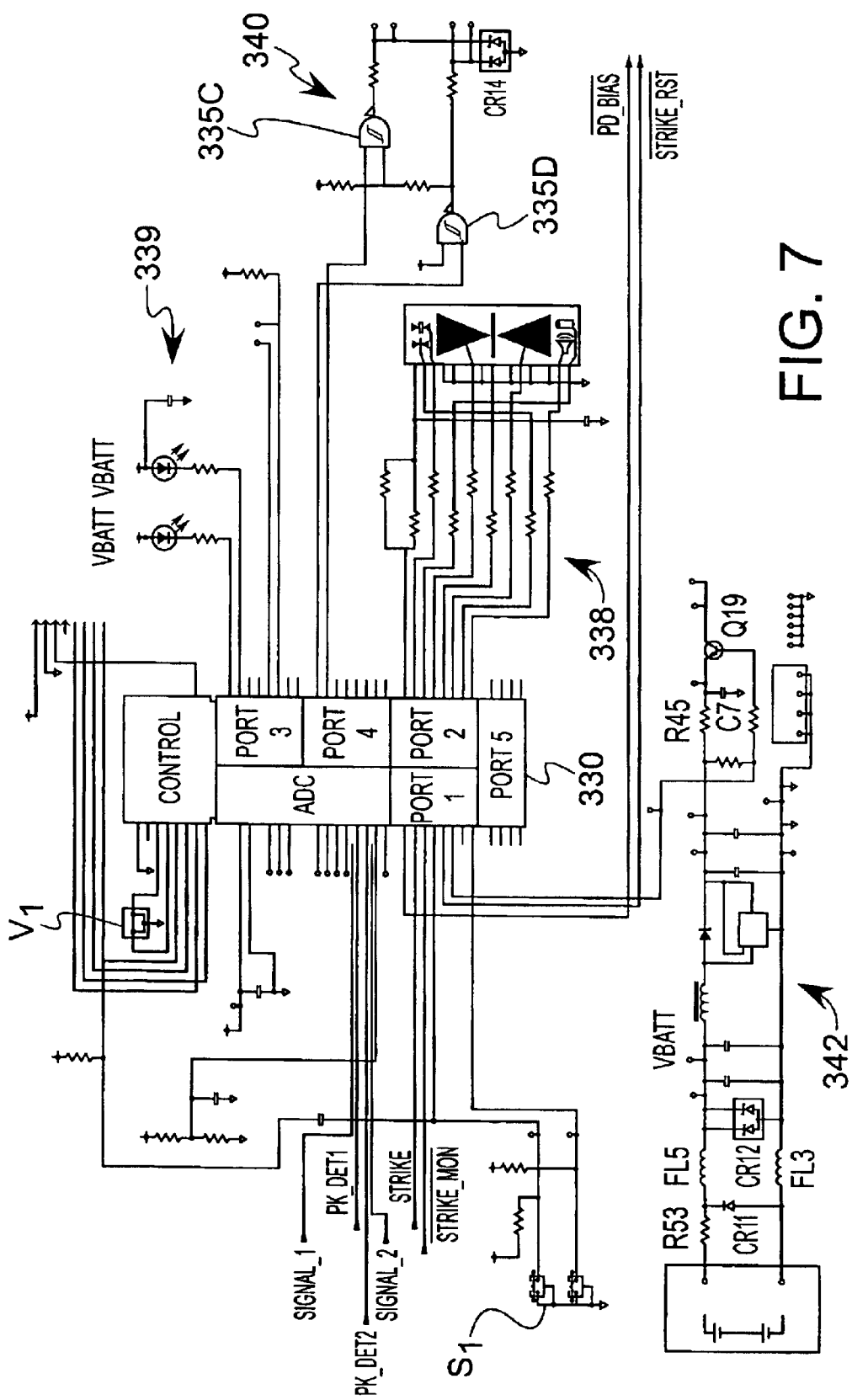
FIG. 7 is a schematic illustration of an exemplary microprocessor for use with the circuit of FIG. 6 according to an embodiment of the present invention.

Referring to FIGS. 6A, 6B and 7, one exemplary circuit 300 is provided for implementing a laser receiver circuit such as that illustrated in the block diagram of FIG. 5. The circuit 300 illustrated in FIGS. 6A, 6B and 7 provides one example of a simplified, low cost circuit suitable for battery powered operation.

The Photodetector Input

In a typical application, a laser transmitter or other illuminated target produces a beam of coherent light that repeatedly sweeps across a target area. A photodetector in a laser receiver circuit positioned within the target area is used to identify the presence the swept beam, which is typically detected as a train of pulses, one pulse for each sweep of the beam from the laser transmitter.

The photodetector 102, conceptually illustrated as having triangular shaped first and second detector sections 104, and 106 as illustrated in FIGS. 2–4, and correspondingly, the photodetector 202 having first and second detector sections 204 and 206 as illustrated in FIG. 5, is realized in FIG. 6A, by providing a photodetector 302 comprising ten PIN diodes CR1–CR10 arrayed in a column. PIN diodes CR1–CR10 are one exemplary photosensitive devices that is well suited for use as a light detector in the application of a low cost receiver because a typical PIN diode can output a current that is proportional to, or at least related to the intensity of light impinging thereon. For example, PIN diodes, such as 4802-2523 diodes, provide sufficiently low internal noise, an intrinsically fast response time and relatively low cost for detecting a typical rotating laser transmitter.

PIN diodes CR1 thru CR4 are connected in parallel to define a first detector section 304 and CR7 thru CR10 are connected in parallel to define a second detector section 306. CR5 and CR6 are located in the center of the column of PIN diodes and are used to define an "on grade" region. Weighting resistors R12, R13 and R14 are used to bridge the PIN diodes CR5 and CR6 between the first and second detector sections 304, 306. For example, weighting resistors R12 and R14 may comprise 25 ohmn resistors, and weighting resistor R13 may correspondingly comprise a 20 ohm resistor. Other resistor values may alternatively be selected to weight the PIN diodes CR5 and CR6 with respect to the remaining PIN diodes.

The PIN diodes CR1–CR10 are operated at zero bias by coupling the anodes of each PIN diode CR1–CR10 to ground potential. Where battery life is not of concern or where transient response time of the PIN diodes needs to be improved, a reverse voltage may be applied between the cathode and anode of each PIN diode CR1–CR10.

Different quantities and types of diodes or other photosensitive devices may alternatively be used as described more fully herein. For example, the photodetector 302 may comprise silicon photodiodes or one or more monolithic devices, examples of which include bi-cells, split cells and position detector cells. The particular type of photosensitive device may also vary depending upon the desired sensitivity or spectral frequencies to be detected. Moreover, while the PIN diodes CR1–CR10 are arranged in a single column, other orientations and configurations are also possible.

The circuit 300 processes two channels of laser data to determine beam position. As such, the various components responsible for processing the outputs of the photodetector 302 will be described generally as components of channel A or channel B.

Detector Filter Circuit

The output of the photodetector 302 may be filtered such that measured light having spectral frequencies outside a predetermined frequency range of interest are attenuated or ignored. For example, sunlight will "look" generally like a DC current output by the photodetector 202. Even on a cloudy day or in less than perfect environmental conditions, the intensity of ambient light may change, but the change happens gradually over long periods of time relative to the time upon which the laser impinges upon the photocell detector 302. Under these circumstances, ambient light still "looks" like a DC current, or low frequency current, for example, on the order of a few hertz or less. As the laser is swept across the photodetector 302, an output current is generated having relatively high spectral frequencies in comparison to the background light. For example, the laser light may have a frequency in excess of 100 kilohertz and even into the megahertz range. As such, the output of the photodetector 302 will have two components, including a slowly varying or DC component and an AC component representing the laser strike (which is the signal of interest).

The photodetector 302 outputs a first detector output signal 310 and a second detector output signal 312 where the relative amplitudes of the first and second detector output signals 310, 312 are related to the position of a beam impinging on the photodetector 302. Implementing the photodetector 302 as an array of PIN diodes CR1–CR10, the photodetector 302 introduces the first detector output signal 310, also referred to as a photodiode current pulse $I_{(A)}$ 310, into channel A where the amplitude of the current is generally related to the intensity of light impinging upon PIN diodes CR1–CR6 as a laser beam is swept across the PIN diodes CR1–CR10. The photodiode current pulse $I_{(A)}$ 310 is initially filtered by channel A filter 314 comprising inductor L1, R11, FL1 and C3.

Similarly, the photodetector 302 introduces the second detector output signal 312, also referred to herein as a photodiode current pulse $I_{(B)}$ 312, into channel B, where the amplitude of the current is generally related to the intensity of light impinging upon PIN diodes CR5–CR10 as the laser beam is swept across the PIN diodes CR1–CR10. The photodiode current pulse $I_{(B)}$ 312 is initially filtered by channel B filter 316 comprising inductor L2, resistor R15, inductor FL2 and capacitor C4.

Inductor L1 acts as a filter to shunt DC and low frequency components of the output current $I_{(A)}$ to ground. Inductor L2 acts as a filter to shunt DC and low frequency components of the output current $I_{(B)}$ to ground. The inductors L1 and L2 are modeled as short circuits for DC sources thus directing steady ambient light to ground. At low frequency signals, the inductive reactance of the inductors L1 and L2 is small and creates the appearance of very small impedances. However, when a laser strike occurs, the current output by the photodetector 202 looks like a relatively high frequency AC signal and the inductive reactance of the inductors L1 and L2 is large, thus the output current of the photodetector 202 sees a high impedance load and the currents are passed to the remainder of the circuit 300. The high pass filtering effect of the inductors L1 and L2 is thus useful for example, to distinguish a true laser beam strike by removing from the circuit 300, ambient effects such as sunlight or other light sources that are constant or vary with a low frequency. As an example, 1 millihenry inductor may be used for both L1 and L2.

FL1 is provided to reduce electromagnetic interference susceptibility of the output current $I_{(A)}$ and resistor R11 and capacitor C3 form a low pass filter to provide high frequency stability. Similarly, FL2 is provided to reduce electromagnetic interference susceptibility of the output current $I_{(B)}$ and resistor R15 and capacitor C4 form a low pass filter to provide high frequency stability. FL1 and FL2 may comprise for example, a BLM11B221SB ferrite chip filter. The values of R11/C3 and R15/C4 will depend upon the desired frequency response of the circuit. For example, the circuit can be tuned to achieve a desired frequency range to increase the selectivity or alternatively increase the tolerance of the filter section of the circuit.

Buffer and Log Amplifier

The output of the channel A filter 314 is coupled to a channel A buffer circuit 318, which is constructed around transistors Q3 and Q6 to buffer the filtered photodiode current pulse $I_{(A)}$ 310. Similarly, the output of the channel B filter 316 is coupled to a channel B buffer circuit, which is constructed around transistors Q4 and Q7 to buffer the filtered photodiode current pulse $I_{(B)}$ 312. In their respective configurations, transistors Q3/Q6 and transistors Q4/Q7 each form a current-to-current amplifier having a low input impedance seen looking at the emitter of transistor Q6 and Q7, and a high output impedance seen at the collectors of transistor Q6 and Q7 respectively. For example, referring to Channel A, the emitter of transistor Q6 is DC coupled to the filtered current $I_{(A)}$ 310. Capacitor C5 provides coupling and can take on any suitable value, such as 10 microfarads. Resistors R6, R1 and R2 provide the appropriate DC bias to transistor Q3. Capacitor C2 provides supply bypassing and decoupling. For example, given a voltage VCC of 3.3 volts, resistor R6 may comprise a 1 kohm resistance, resistor R1 may comprise a 10 kohm resistance and resistor R2 may comprise a 31 kohm resistance. Capacitor C12 provides coupling and filtering between stages of the first channel buffer 318.

With respect to channel B, the emitter of transistor Q7 is DC coupled to the filtered current $I_{(B)}$. Capacitors C6 and C13 provide coupling, and resistors R6, R3 and R4 provide the appropriate DC bias to transistor Q4. The circuit values for the components in the channel B buffer 320 may be identical to those identified for the channel A buffer 318.

Also, any suitable RF transistor may be used in the circuit for the channel A and channel B buffers 318, 320. For example, according to one embodiment of the circuit 300, MMBTH10RF transistors are used. According to an embodiment of the present invention, MMBTH10RF transistors are used for every transistor device in the buffer and log amplifier stages of the circuit 300 except for transistors Q5 and Q8, which are MMBT5089 transistors.

The output of the channel A buffer 318 is coupled to a channel A log amplifier 322, which is constructed around transistor Q2 to compute the log of the buffered and filtered photodiode current pulse $I_{(A)}$ 310. Similarly, the output of the channel B buffer 320 is coupled to a channel B log amplifier 324, which is constructed around transistor Q1 to compute the log of the buffered and filtered photodiode current pulse $I_{(B)}$ 312.

Referring to channel A, the photodiode current pulse $I_{(A)}$ 310 is AC coupled from the collector of transistor Q6 to the emitter of transistor Q2 by capacitor C14. Resistors R5 and R8 are provided to lightly bias transistor Q2 into conduction to establish a stable zero-signal bias point. For example, with a supply voltage Vcc of 3.3 volts, resistor R5 equal to 1 kohm and resistor R8 equal to 681 kohms, the transistor Q2 will be lightly biased with about 4 microanps, which is sufficient to establish a stable zero-signal bias point. Capacitor C1 provides supply voltage bypassing and decoupling and capacitor C11 provides high frequency stabilization.

Referring to channel B, in a similar fashion to that described above, the photodiode pulse current $I_{(B)}$ 312 is AC coupled from the collector of transistor Q7 to the emitter of transistor Q1 by capacitor C15. Resistors R5 and R7 are provided to lightly bias transistor Q1 into conduction to establish a stable zero-signal bias point and capacitor C10 provides high frequency stabilization.

The logarithmic function of Vbe versus collector current of transistor Q2 is used to convert the photodiode pulse current $I_{(A)}$ in channel A to a logarithmic voltage. Similarly, the logarithmic function of Vbe versus collector current of transistor Q1 is used to convert the photodiode pulse current $I_{(B)}$ of channel B to a logarithmic voltage. This is an intrinsic property of the silicon bipolar junction transistor that is a function of the ratio of collector currents I2, I1 and absolute temperature. At room temperature the equation is:

$$26\ mv*ln(I2/I1),$$

which is close to 60 mV per decade of collector current. It should be observed that transistors Q2 and Q1 will track each other over temperature thus canceling out temperature dependent inconsistencies in receiver circuit performance between channel A and channel B.

The log function has an added benefit of compressing the dynamic range of the input signal. For example, given the exemplary values for the circuit described herein, the dynamic range of the photodiode pulse currents $I_{(A)}$ and $I_{(B)}$ may be compressed from around 200 to 1 down to 8 to 1. Therefore, very wide dynamic range peak detectors and/or multiple gain settings are not required, and a lower supply voltage can be used for the analog circuits. This also enables a lower cost peak detector circuit to be used as will be described more fully herein.

The high output impedance seen at the outputs of the channel A and channel B buffers 318, 320 (the collectors of transistors Q6 and Q7 respectively) is improved by bootstrapping circuits. Transistor Q5, resistor R16 and capacitor C14 define a channel A bootstrap circuit. Similarly, transistor Q8, resistor R17 and capacitor C15 define a channel B bootstrap circuit.

Transistors Q5 and Q8 further act as emitter followers for the logarithmic responding voltages across Q2 and Q1, respectively. It should be observed that transistors Q2 and Q1, which perform the function of providing logarithmic voltage gain of the channel A log amplifier 322 and channel B log amplifier 324 respectively, are positioned in the place of resistors in the bootstrap circuits that would otherwise have been determined in the transimpedance gain of the front-end amplifiers.

Scaling Second Amplifier Stage

Referring to FIG. 6B, the output of the channel A log amplifier 322 is coupled to a channel A scaling amplifier 326. This is seen as the logarithmic responding voltage output at the emitter of transistor Q2, which is buffered by emitter follower Q5 and is AC coupled via the coupling capacitor C19 to a second amplifier stage consisting of transistors Q11 and Q13. The transistors Q11 and Q13 define an inverting voltage amplifier that provides a gain set predominantly by R27 and R33 to scale the logarithmic responding voltage output to a value suitable for subsequent processing. Resistors R24, R23 and R34 provide the necessary DC bias and capacitor C22 provides supply voltage conditioning. For example, given a supply voltage of 3.3 volts and resistance values of 50 kohms for R23, 20 kohms for R24, 5 kohms for R27, 31 kohmns for R33 and 5 kohms for R34, a gain of approximately 5.5 is realized. Accordingly, approximately a 200 to 1 dynamic range in the photodiode pulse current $I_{(A)}$ 310 results in about 140 mV at transistor Q2 (channel A log amplifier 322 ), which is amplified to about 750 mV at the emitter of transistor Q13 (channel A scaling amplifier 326 ). Other supply voltage and bias points may be selected other than those exemplary values described above.

Similarly, referring to channel B, the logarithmic responding voltage output at the emitter of transistor Q1 of the channel B log amplifier 324 is buffered by emitter follower Q8 and is AC coupled via the coupling capacitor C20 to a channel B scaling amplifier 328, defined by a second amplifier stage consisting of transistors Q12 and Q14, which define an inverting voltage amplifier that provide a gain set predominantly by resistors R30 and R36.

Resistors R25, R26 and R35 provide the necessary DC bias and capacitor C21 provides supply voltage conditioning.

Peak Detector

Referring to channel A, the output of the channel A scaling amplifier 326 seen at the emitter of transistor Q13 provides a signal that may optionally be coupled to a microprocessor as described in more detail below. The emitter of transistor Q13 is also coupled to a channel A peak detector circuit 332 defined around transistors Q15 and Q16. Basically, transistor Q15 and capacitor C24 detect the peak of the signal appearing at the inverting voltage amplifier (the emitter of transistor Q13). Resistor R23 increases the DC bias points of the emitter of transistor Q13. This has the effect to forward bias transistor Q15. Resistor 41 and transistor Q16 form a corresponding first discharge circuit to reset the first peak detector. Transistor Q16 operates as a switch and is normally biased on while no strike is detected to discharge capacitor C24 via resistor R41 to ground. The strike controller 335 maintains control of the switching function of transistor Q16 as will be explained more fully herein.

Referring to channel B, the output of the channel B scaling amplifier 328 seen at the emitter of transistor Q14 provides a signal that may optionally be coupled to a microprocessor as described in more detail below. The emitter of transistor Q14 is also coupled to a channel B peak detector circuit 334 defined around transistors Q17 and Q18. Similar to that described above, transistor Q17 and capacitor C25 detect the peak of the signal at the inverting voltage amplifier (the emitter of transistor Q14). Resistor R26 increases the DC bias of emitter of transistor Q14 to forward bias transistor Q17. Resistor R42 and transistor Q15 form a second discharge circuit to reset the second peak detector. Transistor Q18 operates as a switch and is normally biased on while no strike is detected to discharge capacitor C25 via resistor R42 to ground. The strike controller 335 maintains control of the switching function of transistor Q18.

According to an embodiment, transistors Q15, Q16, Q17 and Q18 comprise BC846B transistors, resistors R41 and R42 comprise 10 kohm resistors, and capacitors C24 and C25 comprise 3300 picofarad capacitors. To further keep cost down, the peak hold capacitors C24 and C25 are not buffered by op-amps. Instead, as best seen in FIG. 7, the values of the peak hold capacitors C24 and C25 are provided as signals on control lines PK_DET1 and PK_DET2 respectively, which are coupled to a microprocessor as will be explained more fully herein.

Strike Detector

The outputs of the channel A and channel B scaling amplifiers 326, 328 are examined to determine when a strike of a laser beam occurs by the strike detector 336. Basically, the outputs of the channel A and channel B scaling amplifiers 326, 328 taken at the emitters of transistors Q13 and Q14 respectively, are summed through resistors R28 and R29. The outputs of Channel A and Channel B are typically equally weighted, such as by using 4 kohm resistors for both resistors R28 and R29. The signals summed through R28 and R29 are then coupled through capacitor C17 and appear at the emitter of transistor Q9. Transistor Q9 is configured as a common base amplifier.

Transistor Q9 provides a temperature compensated DC bias for transistor Q10. Resistors R18, R19, R20, R21 and R22 provide the necessary DC bias for transistors Q9 and Q10. For example, given a voltage Vcc of 3.3 volts, resistors R18 and R21 can comprise 20 kohm resistors and R18 can comprise a 31 kohm resistor, R20 can comprise a 2 kohm resistor and C18 can comprise a 0.1 microfarad capacitor. Resistor R22 sets a zero-signal bias current. For example, given the above example, resistor R22 can comprise a 50 kohm resistor and the zero-signal bias current should be about 5 uA in transistor Q10. As such, the transistor Q10 behaves like a switch biased lightly to turn on. Transistor Q9 is configured as a common base amplifier having its collector tied to the base of transistor Q10. As such, transistors Q9 and Q10 form a strike detector useful for detecting the strike of an incident laser beam.

When no laser strike is occurring, the voltage summed at the resistors R28, R29 is relatively low, and thus the voltage seen at the collector of transistor Q9 is relatively low. The low voltage at the collector of transistor Q9 is coupled to the base of transistor Q10, thus the emitter-base junction of transistor Q10 conducts negligible current and transistor Q10 is operated close to the cutoff mode. As such, the "switch" defined by transistor Q10 is off, and the voltage seen at the collector of transistor Q10 is seen as a high logic level output and defines an active low logic control signal labeled/STRIKE_MON, which can be coupled to a microprocessor for laser strike detection.

The control signal /STRIKE_MON is also coupled to the strike controller 335, which may be used to produce a cleaner control signal. For example, the strike controller comprises a device such as a quad, two input, Schmidt trigger NAND gate device. The control functions of the strike controller 335 are determined by a first and second NAND gate 335A, 335B. Briefly, the active low control signal /STRIKE_MON is coupled to a first input of the first NAND gate 335A. The second input of the first NAND gate is provided by the output of the second NAND gate 335B. Similarly, the output of the first NAND gate 335A is coupled to the first input of the second NAND gate 335B. The second input of the second NAND gate 335B is provided by a control signal /STRIKE_RST, which is issued by the microprocessor and will be described in greater detail later. The first and second NAND gates 335A, 335B serve to latch the detection of a laser strike. Also, the first input of the first NAND gate 335A is a Schmidt trigger input of the active low control signal /STRIKE_MON from the collector of transistor Q10, which serves to square up the rise and fall times of collector output of transistor Q10.

When a laser strike occurs, the voltage at the summing circuit of resistors R28 and R29 (the outputs of channel A and channel B scaling amplifiers 326, 328) will increase, thus the collector of Q9 switches transistor Q10 "on" signifying the detection of a pulse. When transistor Q11 turns on, the output seen at the collector of transistor Q10 (the /STRIKE_MON control signal) is seen as a low logic level. When the voltage at the summing circuit of resistors R28 and R29 drops of, indicating the trailing edge of a detected pulse, the voltage at the collector of transistor Q9 decreases turning transistor Q10 back off.

As with the buffer and log amplifier stages of the circuit 300, any suitable transistor may be used for the channel A and channel B scaling amplifiers 326, 328, peak detectors 332, 334, and strike detector 336. For example, according to one embodiment of the circuit 300, MMBTH10RF transistors are used for transistors Q11, Q13, Q12, Q14 in the scaling amplifiers 326, 328 and transistors Q9, Q10 in the strike detector 336, and BC846B transistors are used for transistors Q9, Q10, Q11, Q12 in the peak detectors 332, 334 respectively.

Microprocessor and Displays

Referring to FIG. 7, a processor is provided to control displays, perform the calculations for beam position and to provide control signals to control certain aspects of the circuit shown in FIGS. 6A, 6B. According to one embodiment of the present invention, the processor 330 comprises a MSP43OF133 microprocessor by Texas Instruments. The MSP430F133 is a convenient choice for the processor 330 because this chip offers 16 bits of resolution and operates on 2.2 to 3.6 volts. The MSP430F133 further has 4 kb of built in FLASH memory, programmable through its JTAG port, a built in 12 bit A/D converter, and several easily configurable ports for controlling signal inputs/interrupts and outputs, such as to control displays. Without the integral A/D converter in use, the chip can operate from 1.8 to 3.6 volts. Other processors may be used with the circuit schematically shown in FIGS. 6A, 6B, however, if the selected processor does not have integral memory or analog to digital converter components, then separate hardware components may be required.

Briefly, the processor 330 is conceptually organized into several component sections. The control section is coupled to a 4 megahertz crystal V1 for microprocessor timing, and various reset conditions are provided, such as via the reset switch S1 and corresponding circuitry to the control section. The microprocessor analog to digital converter section (ADC) receives input signals PK_DETI and PK_DET2 (and/or SIGNAL_1 and SIGNAL_2). The A/D converter (whether integral with the microprocessor 330, or provided as a dedicated component) may comprise for example, a switched capacitor type sampling A/D converter. The A/D converter may inject a finite amount of charge into capacitors C24 and C25 of the peak detecting circuits for channel A and channel B respectively. For example, an injection into capacitors C24 and C25 has been observed at about 10 mV each sample, thus the circuit and/or processor may provide corrections thereto.

It should be observed that the peak detectors 332, 334 might be unnecessary where the ADC, whether integral to the processor 330 or as a separate component, is coupled to the SIGNAL_1 and SlGNAL_2 signals, and is capable of sampling at a rate sufficient to allow the processor 330 to determine the signal peaks. It should also be observed that the certain signal traces might benefit from the use of guard bands or other circuit layout techniques.

A Port 1 section of the microprocessor 330 provides inputs to receive the STRIKE and /STRIKE_MON control signals illustrated in the circuit shown in FIG. 6B. The Port 1 section also provides outputs for the /PD_BIAS and /STRIKE_RST control signals. The /STRIKE_RST signal is coupled to the strike controller 335 shown in FIG. 6B. The /PD_BIAS signal is coupled to the channel A and channel B scaling amplifiers 326, 328 via the biasing resistor R32 coupled to the base of the transistor Q11, and through the biasing resistor R37 coupled to the base of the transistor Q12 respectively.

A Port 2 section of the microprocessor 330 couples to a display device 338, which visually illustrates whether the photodetector 302 of the circuit 300 described with reference to FIG. 6A is above or below a swept laser plane of light. A Port 3 section provides a battery power indicating output 339. A Port 4 section is coupled to an audio output device 340. A Port 5 section of the microprocessor 330 in the illustrative example is not used.

Displays and Audio

The display device 338 may comprise for example, an LCD display, which is driven directly from the microprocessor 330. Grade display LED's located for example, on the rear of the receiver may also be driven directly from the microprocessor 330. The audio output device 340 may also optionally be provided, such as by a piezoelectric sounder. For example, recall that the strike controller 335 discussed with reference to FIG. 6B used only two of the four available, two-input Schmidt trigger NAND gates on the device U1. The third and fourth NAND gates 335C and 335D may be used to form a driver for the piezoelectric sounder. The frequency of the piezoelectric sounder is generated for example, by a counter/timer in the microprocessor 330. Diode CR14 provides ESD protection and also clamps the large voltage generated by the piezoelectric sounder whenever the unit is subjected to shock.

Power Supply

A 3.3 volt boost converter circuit 342 is constructed to condition the voltage, for example, provided by two "AA" battery cells. Reversed battery protection is provided by polyswitch R53 and diode CR11. Inductors FL5 and FL3 are provided to reduce EMI susceptibility. Diode CR12 provides ESD transient protection for the VBATT voltage because it powers the two LED's driven directly by the microprocessor 330. The 3.3 volt supply is always "on". If a "sleep" function is desired to save battery life, such functionality can be implemented by the microprocessor 330. The 3.3 volt boost converter circuit 342 has a very low quiescent current, prolonging battery life. Resistor R45 and capacitor C7 filter analog power, and the boost converter circuit 342 is switched off with transistor Q19 when the receiver 300 is off.

Detecting and Measuring a Strike

Referring to FIGS. 6A, 6B and 7 generally, during steady state conditions when no laser beam strike is occurring, the control signal /STRIKE_MON (collector output of the strike detector transistor Q10) is seen as a high logic level as described more fully above. The /STRIKE_MON signal is coupled to the strike controller 335, and in particular, to the first input of the first NAND gate 335A. Assume that the control signal /STRIKE_RST (the value of which is determined by the miicroprocessor 330) is also at a high logic level. The control signal /STRIKE_RST is coupled to the second input of the second NAND gate 335B. The output of the first NAND gate 335A is coupled to the first input of the second NAND gate 335B, and correspondingly, the output of the second NAND gate 335B is coupled to the second input of the first NAND gate 335A. As such, a flip-flop is realized. Also, assume that a low logic value appears at the output of the first NAND gate 335A. The output of the first NAND gate 335A provides the STRIKE control signal to the microprocessor 330. The low logic level at the output of the first NAND gate is fed to the first input of the second NAND gate 335B driving the output of the second NAND gate 335B high. Thus the low level for STRIKE is latched and the microprocessor 330 is informed that no strike is occurring.

No Laser Strike

Assume that the control signal /STRIKE_RST is maintained as a high logic level. Up to the time that a strike is detected, the output of the second NAND gate is set to a high logic level. The output of the second NAND gate 335B feeds back to the circuit 300 through resistor R43 and capacitor C26. Feedback further continues along a first path through resistor 39 to the base of transistor Q16 (the discharge circuit of channel A), and along a second path through resistor R40 to the base of transistor Q18 (the discharge circuit of channel B). Recall that transistors Q16 and Q18 are configured to behave like a switch. The high logic level voltage that appears at the base of transistors Q16 and Q18 has the effect of turning the transistors on thus discharging the capacitors C24, C25 respectively.

Laser Strike

When a laser strike occurs, a relatively high frequency AC pulse is seen at the outputs of the photodetector 302. The AC pulse represented by the photodiode pulse currents $I_{(A)}$ and $I_{(B)}$ 310 and 312 is filtered by first and second channel filters 314, 316, buffered by first and second channel buffers 318, 320, processed by log amplifiers 322, 324 and eventually amplified at first and second channel scaling amplifiers 326, 328. The first and second channel scaling amplifiers 326, 328, seen at the output of the emitters at transistors Q13 and Q14 respectively, are summed through resistors R28 and R29 and coupled to the common base amplifier defined by transistor Q9. The increased voltage summed by the resistors R28, R29 is coupled to the emitter of transistor Q9 and increases the output of the common base amplifier at the collector of transistor Q9.

The increased voltage at the collector of transistor Q9 turns transistor Q10 on. This has the effect of driving the strike detector output /STRIKE_MON seen at the collector of Q10 to a signal level seen as a low logic level. The low logic level signal /STRIKE_MON sets input 1 of the first NAND gate 335A low, which drives the output of the first NAND gate 335A high, and correspondingly drives the output of the second NAND gate 335B low (as long as the control signal /STRIKE_RST remains high). Thus the signal STRIKE is set high commensurate with the rising edge of the beam strike.

When the output of the second NAND gate 335B goes low, transistors Q16 and Q18 are turned off, which turns off the peak detector discharge. The output of the first and second channel scaling amplifiers 326, 328 are now being applied to the bases of transistors Q15 and Q17 of the respective first and second channel peak detector circuits 332, 334. With transistors Q16 and Q18 of the first and second channel discharge circuits turned off, transistors Q15 and Q17 of the first and second channel peak detectors 332, 334 act like diodes with current gain, and begin charging capacitors C24 and C25 toward their respective peak voltages. Recall that the discharge was kept on up until the instant that a beam strike occurred, keeping Q15 and Q17 biased on at a moderate current to improve linearity for small signals. This may improve the sensitivity of the peak detectors to low amplitude signals.

The control signal STRIKE from the strike controller 335 generates an interrupt in the microprocessor 330 commensurate with the rising edge of the beam strike. Now the active low signal /STRIKE_MON is monitored by the microprocessor 330 to determine when the beam strike has ended. When the laser strike ends, the voltage seen across the summed resistors R28, R29 of the strike detector 336 decreases. This has the effect to lower the voltage at the collector of transistor Q9, which turns transistor Q11 back off. When Q10 is turned back off, the voltage at the collector of Q10 increases and the control signal /STRIKE_MON is once again seen as a high logic level signal indicating to the microprocessor 330 that the laser strike has ended. In response thereto, the microprocessor 330 immediately sets the control line /PD_BIAS to a high logic value and then the charge on capacitors C24 and C25 are read by the A/D converter via the PK_DET1 and PK_DET2 signals respectively, to produce a Channel A strike measurement and a Channel B strike measurement. The voltages on capacitors C24 and C25 (from the first and second channel peak detectors 332, 334 respectively) thus represent the peak signals detected on channel A and channel B respectively during the previous signal strike.

Setting PD_BIAS high lowers the voltages at the emitter of transistor Q13 and the emitter of transistor Q14 (the output of the first and second channel scaling amplifiers) by altering the DC bias voltages of the first and second channel scaling amplifiers by means of resistors R32 and R37. For example, given the exemplary values for the circuit components described above, the voltages at the emitters of transistors, Q13 and Q14 are reduced by about 180 mV, to more fully turn off the first and second channel peak detectors at transistors Q15 and Q17, respectively. This prevents the voltages on C24 and C25 from drifting positive if the detected photodiode pulse currents $I_{(A)}$ and $I_{(B)}$ were small, because transistors Q15 and Q17 would still likely be conducting some current. This is possible because a delta Vbe of 60 mV causes 10× change in collector current, and a weak value of photodiode pulse currents $I_{(A)}$ and $I_{(B)}$ may be on the order of about 100 mV.

To better calibrate the previously recorded measurements of the charge on capacitors C24 and C25, a zero-signal "background" reading is taken after the beam strike has been read. First, the peak detectors are discharged. The microprocessor 330 toggles the /STRIKE_RST line to a low logic level. When this occurs, input 2 of the second NAND gate 335B is set low, which sets the output of the second NAND gate 335B high, and correspondingly latches the STRIKE signal to a low logic level. The output of the second NAND gate 335B feeds back to the circuit 300 through resistor R43 and capacitor C26. Feedback further continues along a first path through resistor 39 to the base of transistor Q16 (the discharge circuit of channel A), and along a second path through resistor R40 to the base of transistor Q18 (the discharge circuit of channel B). As such, transistors Q16 and Q18 are turned on and discharge capacitors C24, C25 respectively. Next, a false "strike" is initiated by pulsing the control signal /PD_BIAS to a low logic level. The control signal /PD_BIAS is set to a high logic level again, and then the A/D conversion of the voltages on C24 and C25 is taken via control signals PK_DET1 and PK_DET2 to generate a Channel A correction and a Channel B correction. These readings are subtracted from the strike readings previously taken when the strike was read to obtain the actual signal amplitudes to remove variations in the bias points. It also helps subtract out the charge injection due to the A/D converter's sampling, which is about 10 mV per sample. That is:

Channel A amplitude=Channel A measurement−Channel A correction

Channel B amplitude=Channel B measurement−Channel B correction

Beam position=Channel A amplitude−Channel B amplitude

First Order Correction of Low Signal Non-linearity

The equation for position based of a laser beam strike, log(A)−log(B), works for the true logarithms of the two signals A and B. However, some DC bias is applied to transistors Q2 and Q1 (first and second channel log amplifiers 322 and 324) to set an operating point. In practice, the photodiode pulse currents $I_{(A)}$ and $I_{(B)}$ are added to the DC bias currents Q2Idc and Q1Idc of transistors Q2 and Q1 respectively. Given the exemplary values described herein, the changes in Vbe are:

$$26\text{ mV}*\ln\left[\frac{I_{(A)}+Q2Idc}{Q2Idc}\right] \text{ and } 26\text{ mV}*\ln\left[\frac{I_{(B)}+Q1Idc}{Q1Idc}\right], \text{respectively.}$$

Note that the natural logarithm function, ln, is used in the above transistor equations. Re-arranging terms:

$$K*26\text{ mV}*[ln(I_{(A)}+Q2Idc)-ln(Q2Idc)-ln(I_{(B)}+Q1Idc)+ln(Q1Idc)]$$

provides a corrected equation for the position of the laser beam. Given that Q2Idc and Q1Idc are nearly equal, those terms subtract out, leaving:

$$K*26\text{ mV}*[ln(I_{(A)}+Q2Idc)-ln(I_{(B)}+Q1Idc)].$$

The net effect is to widen the deadband as the signals become small because the photocurrent is no longer significantly larger than the DC bias current. Some first order compensation is applied as a correction factor that is a function of signal amplitude. The result of the position equation is multiplied by [(sum+C)/sum], where "sum" is the sum of the two signals $ln(I_{(A)}+Q2Idc)$ and $ln(I_{(B)}+Q1Idc)$. This helps the receiver have a useful deadband at longer distances from the transmitter. Where it is desirable to provide correction, such as the above described low signal non-linearity correction, other correction formulas may be used of course. Further, corrections other than first order corrections may also be implemented.

The laser receiver circuit according to an embodiment of the present invention is suitable for general construction work. For example, the laser receiver circuit may have an accuracy in the range of plus/minus 1/16 inch (1.5875 millimeters) or ⅛ inch (3.175 millimeters) total to ⅛ inch (3.175 millimeters) or ¼ inch (6.35 millimeters) total is typically adequate for certain construction work. Also, the laser receiver circuit according to an embodiment of the present invention is designed to be compatible with a variety of commercially available laser transmitters. As such, the laser receiver circuit may be designed to work for example, with laser transmitters having beam power output that varies from less than one milliwatt up to 5 milliwatts and varying beam divergence across a range of distances.

Having described the invention in detail and by reference to preferred embodiments thereof, it will be apparent that modifications and variations are possible without departing from the scope of the invention defined in the appended claims.

What is claimed is:

1. A receiver circuit for determining the position of a laser beam comprising:
   a photodetector comprising at least one photosensitive device, a first detector output signal and a second detector output signal, the relative amplitudes of said first and second detector output signals related to the position of said beam being swept across and impinging on said photodetector;
   a first log amplifier communicably coupled to said photodetector operatively configured to compute a first log signal that is based upon a logarithmic calculation utilizing said first detector output signal;
   a second log amplifier communicably coupled to said photodetector operatively configured to compute a second log signal that is based upon a logarithmic calculation utilizing said second detector output signal; and
   a processor operatively configured to compute a position of said beam base upon a subtraction of said second log signal from said first log signal.

2. The receiver circuit according to claim 1, wherein said first log amplifier further provides a first gain to said first log signal and said second log amplifier provides a second gain to said second log signal.

3. The receiver circuit according to claim 1, wherein said first and second log amplifiers are implemented using transistor circuits.

4. The receiver circuit according to claim 3, wherein said first and second log amplifiers are implemented using bipolar junction transistors.

5. The receiver circuit according to claim 4, wherein said first and second log amplifiers are implemented by the intrinsic logarithmic base to emitter voltage versus collector current property of a silicon bipolar junction transistor.

6. The receiver circuit according to claim 1, further comprising a first linear amplifier coupled between said first log amplifier and said processor operatively configured to provide a fist gain to said first log signal and a second linear amplifier coupled between said second log amplifier and said processor operatively configured to provide a second gain to said second log signal.

7. The receiver circuit according to claim 6, wherein said first and second linear amplifiers comprise inverting transistor amplifier circuits.

8. The receiver circuit according to claim 1, further comprising a first filter coupled to said photodetector adapted to filter said first detector output signal and a second filter coupled to said photodetector adapted to filter said second detector output signal.

9. The receiver circuit according to claim 1, further comprising a first peak detector adapted to detect the peak of said first log signal and a second peak detector adapted to detect the peak of said second log signal.

10. The receiver circuit according to claim 9, wherein said first peak detector charges a first capacitor and said second peak detector charges a second capacitor in response to said beam impinging upon said photodetector.

11. The receiver circuit according to claim 10, further comprising a first discharge circuit operatively configured to selectively discharge said first capacitor and a second discharge circuit operatively configured to discharge said second capacitor.

12. The receiver circuit according to claim 1, wherein:
   said first and second detector output signals comprise a current in response to said beam impinging thereupon;
   said first log amplifier is implemented as a first transistor;
   said second log amplifier is implemented as a second transistor; and
   said position of said beam is determined by scaling the result of the equation [ln(A+Q2Idc)−ln(Q2Idc)−ln(B+Q1Idc)+ln(Q1Idc)] where A is the value of said first detector output signal, B is the value of said second detector output signal, Q1Idc is a DC bias current of said first transistor, and Q2Idc is a DC bias current of said second transistor.

13. The receiver circuit according to claim 12, further comprising scaling the computation of said position by a compensation that is a function of the amplitude of said first and second log signals.

14. The receiver circuit according to claim 13, wherein a first order compensation comprises the formula [(sum+C)/sum], where "sum" is the sum of the two signals ln(A+Q2Idc) and ln(B+Q1Idc).

15. A receiver circuit for determining the position of a laser beam comprising:
   a photodetector comprising at least one photosensitive device, a first detector output signal and a second detector output signal, the relative amplitudes of said first and second detector output signals related to the position of said beam impinging on said photodetector;
   a first log amplifier communicably coupled to said photodetector operatively configured to compute a first log signal that is based upon a logarithmic calculation utilizing said first detector output signal, wherein said first log amplifier is implemented using transistor circuits;
   a second lot amplifier communicably coupled to said photodetector operatively configured to compute a second log signal that is based upon a logarithmic calculation utilizing said second detector output signal, wherein said second log amplifier is implemented using transistor circuits, wherein said first and second detector output signals comprise current signals and said circuit further comprises a first current to current buffer circuit to couple said first detector output signal to said first log amplifier, and a second current to current buffer to couple said second detector output signal to said second log amplifier; and
   a processor operatively configured to compute a position of said beam based upon a subtraction of said second log signal from said first log signal.

16. The receiver circuit according to claim 15, wherein said first and second current to current buffer circuits are bootstrapped to increase their respective output impedances.

17. A receiver circuit for determining the position of a laser beam comprising:
   a photodetector comprising at least one photosensitive device, a first detector output signal and a second detector output signal, the relative amplitudes of said first and second detector output signals related to the position of said beam impinging on said photodetector;
   a first log amplifier communicably coupled to said photodetector operatively configured to comprise a first log signal that is based upon a logarithmic calculation utilizing said first detector output signal;
   a second log amplifier communicably coupled to said photodetector operatively configured to compute a second log signal that is based upon a logarithmic calculation utilizing said second detector output signal;
   a strike detector circuit configured to monitor a first signal originated by said photodetector and a second signal originated by said photodetector to identify when said beam is impinging upon said photodetector; and
   a processor operatively configured to compute a position of said beam based upon a subtraction of said second log signal from said first log signal.

18. The receiver circuit according to claim 17, wherein said strike detector sums said first and second signals and determines that said beam is impinging thereon when said sum exceeds a predetermined threshold.

19. The receiver circuit according to claim 17, wherein said processor is operatively configured to measure peaks of said first and second signals in response to said strike detector identifying that said beam is impinging upon said photodetector and compute said position of said beam based upon a subtraction of the peak of said second signal from the peak of said first signal.

20. The receiver circuit according to claim 19, wherein said processor provides a correction to the computation of said position of said beam.

21. A receiver circuit for determining the position of a laser beam comprising:
   a photodetector comprising at least one photosensitive device, a first detector output signal and a second detector output signal, the relative amplitudes of said first and second detector output signals related to the position of said beam impinging on said photodetector;
   a first log amplifier communicably coupled to said photodetector operatively configured to compute a first log signal based upon said first detector output;
   a second log amplifier communicably coupled to said photodetector operatively configured to compute a second log signal based upon said second detector output;
   a first linear amplifier communicably coupled to said first log amplifier adapted to amplify said first log signal and produce a first amplifier output signal;
   a second linear amplifier communicably coupled to said second log amplifier adapted to amplify said second log signal and produce a second amplifier output signal;
   a first peak detector coupled to said first amplifier output signal;
   a second peak detector coupled to said second amplifier signal;
   a strike detector coupled to both said first and second amplifier output signals; and
   a processor operatively configured to compute a position of said beam based upon a subtraction of said second amplifier signal from said first amplifier signal in response to said strike detector indicating that said beam has impinged upon at least one of said first and second detectors.

22. A method of computing beam position in a laser receiver comprising:
   detecting a beam impinging upon a photodetector to produce a first detector output signal and a second detector output signal, the relative amplitudes of said first and second detector output signals related to the position of said beam being swept across and impinging on said photodetector;
   computing a first log signal based upon said first detector output signal;
   computing a second log signal based upon said second detector output signal; and
   determining a beam position by implementing a function comprising subtracting said second log signal from said first log signal.

23. The method according to claim 22, wherein said first log signal is scaled by a first constant, and said second log signal is scaled by a second constant.

24. The method according to claim 22, further comprising determining beam position by scaling the result of said function by a constant.

25. The method according to claim 22, wherein said first log signal is computed using a first log amplifier and said second log signal is computed using a second log amplifier.

26. The method according to claim 25, wherein said first log amplifier further provides a first predetermined gain and said second log amplifier further provides a second predetermined gain.

27. The method according to claim 25, wherein an output of said first log amplifier is scaled by a first linear amplifier and an output of said second log amplifier is scaled by a second linear amplifier.

28. The method according to claim 22, wherein said beam position is implemented by computing said function in software, wherein said software further compensates for non-ideal behavior of said first and second log signals.

29. The method according to claim 22, further comprising filtering said first and second detector output signals.

30. The method according to claim 22, further comprising buffering said first and second detector output signals.

31. A method of computing position in a laser receiver comprising:
   detecting a beam impinging upon a photodetector to produce a first detector output signal and a second detector output signal, the relive amplitudes of said first and second detector output signals related to the position of said beam impinging on said photodetector;
   computing a first log signal based upon said first detector output signal;
   computing a second log signal based upon said second detector output signal; and
   determining a beam position by implementing a function comprising subtracting said second log signal from said first log signal;
   detecting the peak of said first and second log signals, wherein said beam position is determined by implementing a function comprising subtracting the peak of said second log signal from the peak of said first log signal, wherein the peak of said first log signal is determined by charging a first capacitor and the peak of said second log signal is determined by second capacitator, wherein said beam position is determined by reading the charge on said first and second capacitors, wherein said first and second capacitors are continually discharged except when reading the charge thereon;
   discharging said first and second capacitors after reading the respective charges thereon to determine the peak of the first and second log signals;
   taking a first correction reading of the charge on said first capacitor;
   taking a second correction reading of the charge on said second capacitor;
   subtracting said first correction from the peak of said first log signal to determine a first amplitude; and
   subtracting said second correction from the peak of said second log signal to determine a second amplitude, wherein said beam position is determined based upon a subtraction of said second amplitude from said first amplitude.

32. The method according to claim 31, wherein:
   said first log signal is derived by amplifying said first detector output signal using a first transistor amplifier that implements a logarithmic function; and
   said second log signal is derived by amplifying said second output signal using second transistor amplifier that implements a logarithmic function, wherein said beam position computation factors in the respective DC bias applied to said first and second transistor amplifiers.

* * * * *

UNITED STATES PATENT AND TRADEMARK OFFICE
CERTIFICATE OF CORRECTION

PATENT NO. : 6,750,953 B1
DATED : June 15, 2004
INVENTOR(S) : Douglas

It is certified that error appears in the above-identified patent and that said Letters Patent is hereby corrected as shown below:

Column 20,
Line 62, "second output signal" should read -- second detector output signal --

Signed and Sealed this

Twenty-fifth Day of January, 2005

JON W. DUDAS
*Director of the United States Patent and Trademark Office*